United States Patent
Toffle (10) Patent No.: US 9,466,327 B1
(45) Date of Patent: Oct. 11, 2016

(54) COLOR CODED GLASS DISC SPACER

(71) Applicant: Seagate Technology LLC, Cupertino, CA (US)

(72) Inventor: Mark A. Toffle, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/869,082

(22) Filed: Sep. 29, 2015

(51) Int. Cl.
*G11B 17/02* (2006.01)

(52) U.S. Cl.
CPC .................. *G11B 17/021* (2013.01)

(58) Field of Classification Search
None
See application file for complete search history.

(56) References Cited

U.S. PATENT DOCUMENTS

| | | | |
|---|---|---|---|
| 2,237,041 A | 4/1941 | Schreuder | |
| 3,928,050 A | 12/1975 | Jasinski | |
| 5,669,494 A * | 9/1997 | Geffen | G11B 33/045 206/309 |
| 5,760,999 A | 6/1998 | Yahata | |
| 6,215,617 B1 | 4/2001 | Okumura et al. | |
| 6,381,092 B1 | 4/2002 | Suzuki | |
| 6,461,736 B1 | 10/2002 | Nagashima et al. | |
| 6,636,475 B2 * | 10/2003 | Carstensen | G11B 23/0021 369/281 |
| 6,917,496 B2 | 7/2005 | Gillis et al. | |
| 7,042,676 B2 * | 5/2006 | Yoo | G11B 17/02 360/99.12 |
| 7,124,885 B1 * | 10/2006 | Weingarden | G11B 17/0281 206/310 |
| 7,199,952 B2 * | 4/2007 | Niwa | G02B 26/008 353/84 |
| 7,538,975 B2 | 5/2009 | Lee et al. | |
| 7,787,214 B2 | 8/2010 | Miyamori et al. | |
| 2002/0163877 A1 * | 11/2002 | Carstensen | G11B 23/0021 369/281 |
| 2006/0044676 A1 | 3/2006 | Ueda et al. | |
| 2012/0213053 A1 * | 8/2012 | Ashley | G11B 7/00736 369/283 |
| 2014/0355406 A1 * | 12/2014 | Ashley | G11B 7/00736 369/272.1 |

FOREIGN PATENT DOCUMENTS

| | | | | |
|---|---|---|---|---|
| GB | 335768 A | * | 10/1930 | ......... G11B 23/0021 |
| JP | 01290119 A | * | 11/1989 | |
| RU | 2424859 C1 | * | 7/2011 | |

* cited by examiner

*Primary Examiner* — Will J Klimowicz
(74) *Attorney, Agent, or Firm* — Hall Estill Attorneys at Law (57) ABSTRACT

Apparatus and method for supporting a data recording medium adjacent a spindle motor hub. In some embodiments, an annular disc spacer has a plurality of nominal dimensions and is formed of a glass material and at least one additive to provide the disc spacer with a selected color. The color of the disc spacer is selected responsive to at least one of the plurality of nominal dimension of the disc spacer. The color may have a wavelength in the human detectable range of from about 350 nanometers, nm to about 700 nm.

20 Claims, 5 Drawing Sheets

COLOR CODED GLASS DISC SPACER

SUMMARY

Various embodiments of the present disclosure are directed to an apparatus and method for supporting a data recording medium, such as a magnetic recording disc in a data storage device.

In some embodiments, an annular disc spacer has a plurality of nominal dimensions and is formed of a glass material and at least one additive to provide the disc spacer with a selected color. The color of the disc spacer is selected responsive to at least one of the plurality of nominal dimension of the disc spacer.

In other embodiments, an apparatus includes a plurality of populations of disc spacers configured to support a recording disc adjacent a spindle hub. Each population of disc spacers has a different common color corresponding to a unique dimension of each of the disc spacers in the associated population. Each of the disc spacers in the plurality of populations of disc spacers is formed of a glass material and at least one additive to produce the associated common color of each population. A data structure is stored in a memory location that correlates the common color of each population to the unique dimension of the associated population. An end effector is configured to grasp a disc spacer from each of the plurality of populations. An optical detector is configured to detect the color of each disc spacer grasped by the end effector. A control circuit directs the end effector to install each of the grasped disc spacers by the end effector onto a spindle motor hub responsive to the detected color thereof by the optical detector and responsive to the data structure stored in the memory location.

In further embodiments, a method includes detecting a selected color of a disc spacer configured to support a storage medium adjacent a spindle motor hub, the disc spacer formed of a glass material and at least one additive to provide the disc spacer with the selected color corresponding to a dimension of the disc spacer; and installing the disc spacer onto a spindle motor hub responsive to the detected selected color of the disc spacer.

DETAILED DESCRIPTION

The present disclosure is generally directed to data storage systems, and more particularly to a method and apparatus for supporting a data recording medium, such as but not limited to a magnetic recording disc in a hard disc drive (HDD) data storage device.

Data storage devices are used to store and retrieve user data in a fast and efficient manner. Some data storage devices, such as hard disc drives (HDDs), utilize a disc stack of rotatable data recording media (discs) which are rotated at a high rotational rate of speed. The media are provided with data recording surfaces accessed by a corresponding array of data read/write transducers (heads).

A disc stack can include a rotatable hub of a spindle motor to which the respective media (discs) are affixed using a suitable mechanical clamp structure. One or more disc spacers can be used to establish the respective axial elevations of the media. It is common to place a disc spacer between each adjacent pair of the discs to establish a desired inter-disc axial spacing to provide the associated transducers with sufficient mechanical clearance to access the associated facing recording surfaces between the discs.

One limitation of current generation disc spacers relates to component marking requirements. It is common in high volume automated manufacturing environments to assemble thousands, if not millions, of data storage devices on a daily basis. Such environments often use end effectors and other automated equipment to pick and place components onto an assembled stack as the devices are conveyed through the production process.

Because different disc spacers may be required for different products (or even in different positions in the same disc stack), disc spacers are often provided with embossed or printed identification (ID) indicia (e.g., laser markings, adhesive labels, etc.) to provide component part numbers or other information. Such information may be in the form of bar codes, optical character recognition (OCR) characters, etc. which are detected and confirmed by the automated equipment prior to assembly.

While operable, the provision of these or other indicia adds expense to the processing of the individual components and provides an opportunity for particulate contamination within the controlled internal environment of a data storage device housing. For example, laser embossed markings can provide an opportunity for particulate generation if portions of the disc spacer abrade or erode in the vicinity of the embossment. Labels can similarly become detached or otherwise contribute to the generation of undesired contaminants.

Accordingly, various embodiments of the present disclosure are generally directed to a disc spacer for use in supporting a data recording medium that addresses these and other limitations of the current art. As explained below, the disc spacers are formed of glass and are color coded to provide an indicia of particular nominal dimensions of the disc spacer. Disc spacers having different dimensions are provided with different corresponding colors. Optical inspection of a given disc spacer can readily determine the correctly sized spacer has been selected for installation, and the need for separate printed indicia on the disc spacer is eliminated.

In some embodiments, the disc spacers are formed of molded glass material. Additives are provided to achieve the desired color without affecting the mechanical properties of the glass. Additives may be additionally supplied to increase the electrical conductivity of the disc spacer. In other embodiments, less than all of the outermost surfaces of the disc spacer are coated with a conductive layer, such as a thin film sputtered metal layer, to enhance electrical conductivity of the disc spacer. In such latter cases, at least one surface (such as an outermost peripheral surface or a portion thereof) remains uncoated to provide an inspection window that reveals the underlying color of the glass substrate material.

Figure 1:
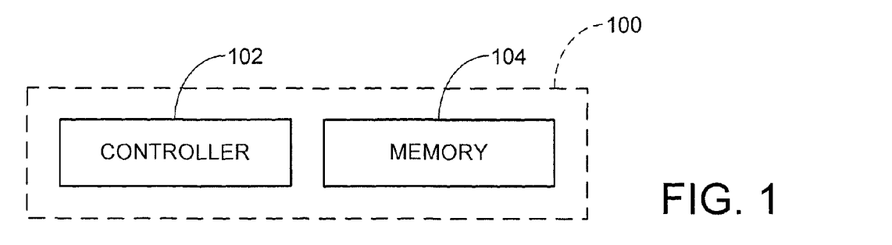
FIG. 1 is a functional block representation of a data storage device in accordance with some embodiments of the present disclosure.

These and other features and advantages of various embodiments of the present disclosure can be understood beginning with a review of FIG. 1 which provides a functional block representation of a data storage device 100. The device 100 includes a controller 102 and a memory module 104.

The controller 102 provides top level control functions for the device 100 in communicating with a host device and in directing data transfers between the host device and the memory module. The controller 102 (also referred to as a "control circuit") may take any number of suitable forms including a hardware circuit, programmable processor, digital signal processor (DSP), system on chip (SOC) integrated circuit device, etc. The controller 102 may execute the various functions based on programming (software or firmware) stored in a suitable memory device.

The memory module 104 includes one or more memory devices configured to store and retrieve user data from the host device. The memory device(s) may take any number of suitable forms including rotatable and solid-state memory. Read/write channel and other processing circuitry may be incorporated into the memory module 104 and operate under the direction of the controller 102 in carrying out data transfer operations.

Figure 2:
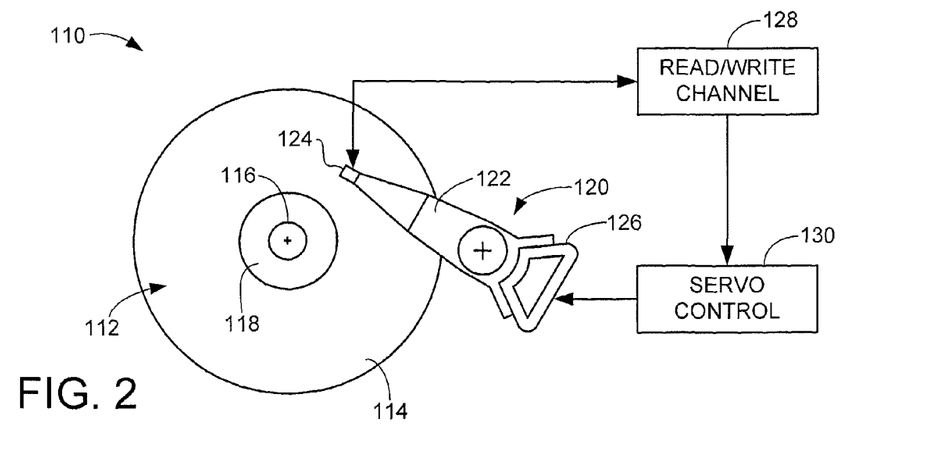
FIG. 2 is a schematic representation of the data storage device of FIG. 1 characterized as a hard disc drive (HDD).

FIG. 2 is a functional block diagram of relevant aspects of a data storage device 110 similar to the device 100 in FIG. 1. The data storage device 110 in FIG. 2 is characterized as a hard disc drive (HDD). The use of an HDD in the present discussion is merely for purposes of providing a concrete example and is not limiting to the scope of the claimed subject matter.

The HDD 110 includes a disc stack assembly 112 having at least one rotatable data recording medium (disc) 114. The disc 114 is mounted to a hub 116 of a spindle motor using a clamp assembly 118. The disc stack assembly 112 is rotated at a suitable high speed by the spindle motor such as 7200 revolutions per minute (rpm), 10,800 rpm, etc.

The rotating disc stack assembly 112 is accessed by a rotary actuator 120 positioned for pivotal movement adjacent an outermost diameter (OD) of the disc(s) 114. The actuator 120 includes an actuator arm 122 that supports, at a distal extent thereof, a data read/write transducer 124. Opposite the actuator arm 122 is a voice coil 126 of a voice coil motor (VCM).

During operation, encoded write data are transferred to the transducer 124 from a read/write channel 128 to be written to tracks (not shown) defined on the media surfaces. Read data are subsequently recovered from the tracks and supplied to the channel 128. Specially configured servo control data are written to the media surfaces to enable a closed loop servo control circuit 130 to provide position control signals to the voice coil 126 to position the transducer 124 adjacent the respective tracks.

Figure 3:
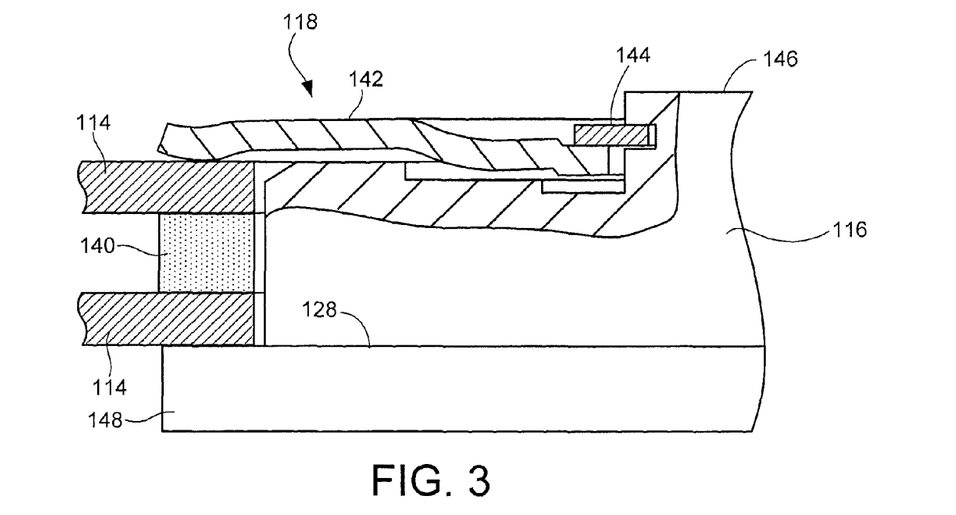
FIG. 3 is a partial cross-sectional elevational view of a disc stack assembly of FIG. 2 in accordance with some embodiments.

FIG. 3 is a partial cross-sectional, elevational view of the disc stack assembly 112 of FIG. 2 in accordance with some embodiments. The assembly 112 is shown to include two (2) axially aligned discs 114. A disc spacer 140 is interposed between the respective discs 140 and will be discussed in greater detail below.

The clamp assembly 118 includes a contoured (Belleville washer) spring member 142 and an annular retention ring 144. The ring 144 is inserted into a groove of an upper projection 146 of the spindle motor hub 116 to secure an innermost diameter (ID) of the spring member 142. The OD of the spring member 142 exerts a downwardly directed clamping force upon the discs 114 and the disc spacer 140. The lowermost disc 114 is supported by a radially extending shoulder support flange 148 of the spindle motor hub 116. A variety of other forms of clamp assemblies can be used as required, including clamp assemblies that utilize threaded fasteners to attach a clamping disc to the spindle motor hub.

Figures 4A, 4B:
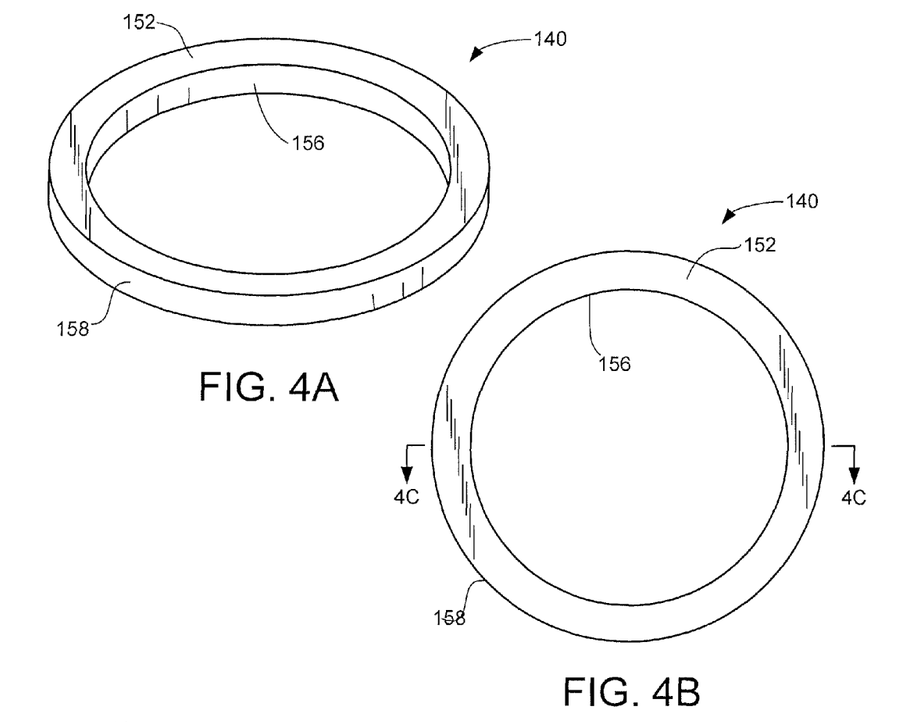
FIGS. 4A-4C illustrate respective views of a color coded glass disc spacer from FIG. 3.
Figure 4C:
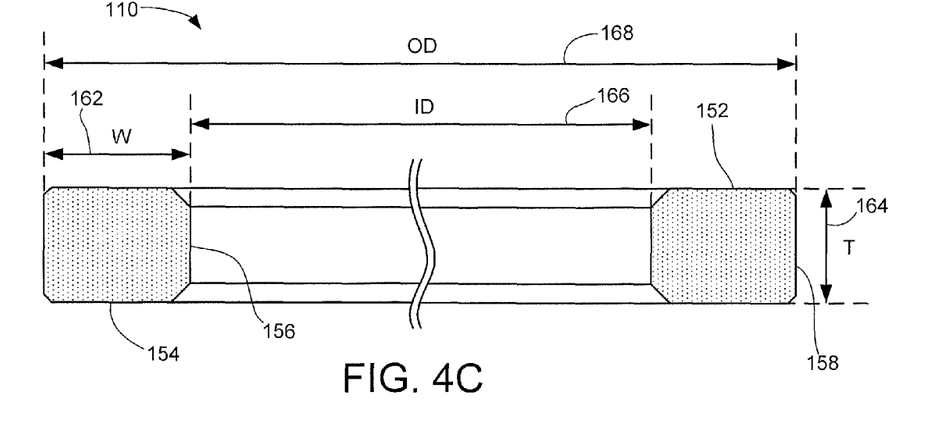

The disc spacer 140 is shown in greater detail in FIGS. 4A-4C. FIG. 4A is an isometric view of the disc spacer; FIG. 4B is a top plan view of the disc spacer; and FIG. 4C is a cross-sectional representation of the disc spacer along line 4C-4C in FIG. 4B. The disc spacer 140 is substantially ring shaped with opposing top and bottom annular surfaces 152 and 154, inner cylindrical surface 156 and outer cylindrical surface 158. Other cross-sectional shapes for the disc spacer can be used.

As depicted in FIG. 4C, the disc spacer is provided with several nominal dimensions including an overall width (W) 162 defined by the radial extent of top and bottom surfaces 152 and 154. An overall thickness (T) 164 is defined by the axial distance between the top and bottom surfaces 152 and 154. An innermost diameter (ID) 166 is defined by the diameter of the innermost surface 156, and an outermost diameter (OD) 168 is defined by the diameter of the outermost surface 158. With reference again to the example configuration of FIG. 3, these respective dimensions (W, T, ID, OD) serve to align the upper and lower discs 114 relative to the spindle motor hub 116. The particular dimensions of a given disc spacer will depend on the requirements of a given installation application.

The disc spacer 140 in FIGS. 3 and 4A-4C is constructed of a molded glass material. One suitable source for the glass material is the same glass material used to form substrates (not separately shown) for magnetic recording discs such as the exemplary discs 116 (FIG. 3), since such materials are suitable for the clamping loads provided by clamp structures such as 118.

Exemplary glass materials can include mixtures of silicon dioxide ($SiO_2$, also referred to as silica or quartz), calcium oxide (CaO), sodium oxide ($NaO_2$), lead (Pb), barium (Ba), boron (B), lithium (Li), aluminium Al), etc. For example and not by way of limitation, the disc spacers 140 can be formed of soda lime glass (based on $Na_2O$—CaO—$SiO_2$), lead glass (based on PbO—$SiO_2$), barium glass (based on BaO—$Al_2O_3$—$SiO_2$), boro-silicate glass (based on $Na_2O$—$B_2O_3$—$SiO_2$), alumina silicate glass (based on $Al_2O_3$—$SiO_2$), Lithia alumina silicate glass (based on $Li_2O$—$Al_2O_3$—$SiO_2$); lead borate glass (based on PbO—$B_2O_3$—$SiO_2$) alumina borate glass (based on $Al_2O_3$—$B_2O_3$); alumina phosphate glass (based on $Al_2O_3$—$P_2O_3$); or any other suitable glass material.

In accordance with various embodiments, one or more coloring agents are added to the glass material to provide the glass with a selected color. Any number of coloring agents can be used, including oxides and/or compounds of copper (Cu), neodymium (Nd), tin (Sn), manganese (Mn), sulfur (S), iron (Fe), carbon (C), nickel (N), gold (Au), selenium (Se), etc. Any number of colors of glass disc spacers can be formed, including but not limited to red, orange, yellow, green, blue, violet, brown, or black.

While it is contemplated that the coloring agent will be mixed into the molded glass material during the formation of the disc spacers so that the color uniformly extends through a thickness of the glass core, in other embodiments the additives may constitute a surface treatment so that only one or more exposed surfaces of the disc spacers are colored with the appropriate color. In further embodiments, multiple colors are applied to the glass material. For example, a first surface or side may be one color (e.g., blue) and another surface or side may be a different color (e.g., red). This can enhance color coding and spacer orientation operations (e.g., blue side down, etc.).

Figure 5:
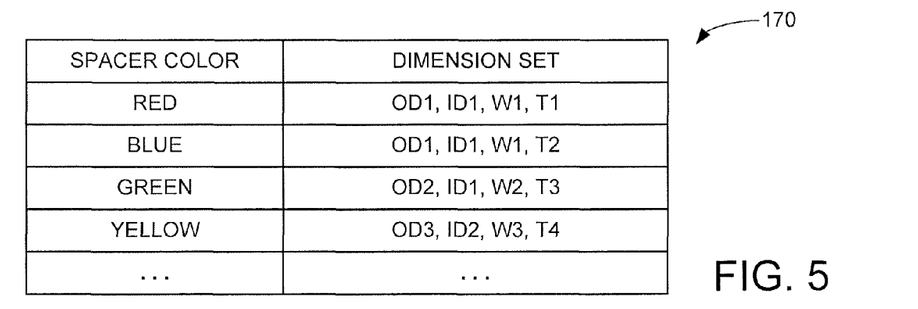
FIG. 5 is a data structure stored in a memory that correlates different colors of glass disc spacers as provided in FIGS. 4A-4C to different dimensions such as illustrated in FIG. 4C.

FIG. 5 shows a data structure 170 that can be used to correlate different colors of disc spacers to different disc spacer dimensions. Generally, a different color range is selected to correspond to a different size of disc spacer. The exemplary data structure 170 shows that, for example, the color red (of a certain wavelength range) can be used for disc spacers having a particular dimension set with a first outermost diameter (OD1), first innermost diameter (ID1), width (W1) and thickness (T1). The color blue can be provided for another population of disc spacers having the same dimensions OD1, ID1 and W1, but having a different thickness (T2). Other colors such as green, yellow, etc. can be used for additional populations of disc spacers with different dimension sets.

While only four (4) colors are shown in the data structure, any number of colors and corresponding dimension sets can be used. The respective colors need not be necessarily discernible as different colors to a human observer, provided the detection equipment used to subsequently detect the specific colors of the disc spacers can differentiate among the various colors. The data structure 170 can take any suitable form, including additional information such as part numbers, revision levels, date codes, etc.

In this way, the disc spacers are color coded with a selected color in a spectral range corresponding to a nominal dimension set. This allows a straightforward and easy way to confirm that a given spacer being installed into a disc stack or other arrangement dimensionally conforms to the specified dimensions for that application without the need to provide printed indicia upon the disc spacer relating to such dimensions.

Figure 6:
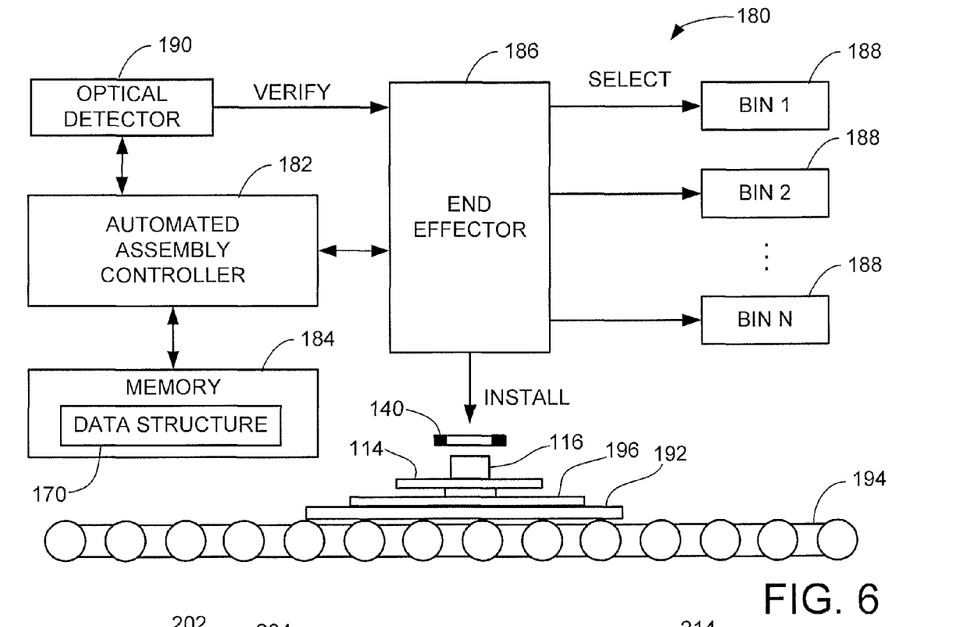
FIG. 6 is a functional block diagram of an automated assembly system that uses the data structure of FIG. 5 during installation of glass disc spacers as set forth in FIGS. 4A-4C in accordance with some embodiments.

FIG. 6 provides an automated assembly system 180 constructed and operated in accordance with some embodiments to assemble populations of data storage devices such as the HDD 110 depicted in FIG. 2. It is contemplated that the system 180 is configured to process many thousands of disc drive assemblies on a daily basis and utilizes a number of automated processing mechanisms to do so.

The system 180 includes an automated assembly controller (control circuit) 182, which may take the form of a hardware or programmable processor or similar circuitry. The controller 182 references a suitable memory device 184, such as volatile or non-volatile solid-state memory (e.g., DRAM, flash memory, etc.) in which the data structure 170 of FIG. 5 is stored.

The system 180 further includes an end effector 186 which may include one or more articulating mechanisms suited to select and grasp disc spacers of different dimensional sizes (and hence, different colors) from a number of bins 188. A total number N bins 188 are shown, with each bin housing or otherwise dispensing components (e.g., disc spacers of a given color) that are, at least normally, nominally identical. An optical detector 190 is arranged to detect color spectral information from the disc spacers selected from the various bins 188.

During operation, a support pallet 192 is conveyed by a conveyor 194 to a position proximate the end effector 186. The pallet 192 may support an HDD housing member (e.g., base deck) 196 which in turn supports aspects of a disc stack assembly, such as the spindle motor hub 116 and lower disc 114 from FIG. 3.

The controller 182 directs the end effector 186 to select a disc spacer from an associated bin 188 intended to house disc spacers of the desired size. The end effector 186 grasps the disc spacer using a suitable mechanical grasping mechanism (e.g., articulated fingers, a suction cup, etc.) and advances the disc spacer to a location proximate the optical detector 190. The optical detector 190 may use a video (e.g., CCD) device or other optical sensor to obtain an optical spectral response from the selected disc spacer. The optical detector may include a light source or other mechanism to enable the detector to detect the color of the selected disc spacer with a high degree of accuracy.

If the controller 182 confirms that the detected color of the disc spacer corresponds to the dimensional set selected for the current assembly operation, based on reference to the data structure 170 in the memory 184, the end effector 186 will be instructed to proceed with installation of the selected disc spacer onto the disc stack assembly, as represented in FIG. 6.

Depending on the configuration of a given disc stack, multiple disc spacers may be arranged at different locations within the stack; for example, a first disc spacer may be placed between a lowermost and an uppermost disc, and a second disc spacer may be placed upon the uppermost disc and the disc clamp assembly. If these spacers are provided with different dimensions (e.g., different thicknesses), the system 180 can readily confirm that the correct disc spacers have been selected for the correct installation locations by determining that each of the spacers have the associated colors indicated by the data structure 170.

Similarly, for manufacturing environments in which numerous different models of data storage devices are manufactured by the same production lines, the color coded disc spacers can be used to ensure that the correct spacers are being installed in a given assembly application. While it is contemplated that the material handling process will accurate segregate the different spacers into the different bins 188, should a spacer be inadvertently loaded to the incorrect bin, the system 180 will detect such and prevent installation of the improper component.

As will be recognized, glass materials as discussed above tend to be electrically insulative in nature. An electrically insulative disc spacer may be appropriate for some applications. In other applications, effects such as the risk of electrostatic discharge (ESD) may result in the need for an electrically conductive glass spacer.

Accordingly, in some embodiments additional additives are supplied to the surface or mixed into the glass material to enhance the electrical conductivity of the disc spacers. Conductive metals such as iron (Fe) or aluminum (Al) may be used to this end. Care should be taken to ensure that such conductive additives do not alter the final desired color of the glass spacer. The conductivity can be a surface layer phenomenon or the additives can be mixed into the glass material.

In other embodiments, a conductive material is deposited onto one or more surfaces of the glass disc spacer. For example, a suitable conductive metal may be sputter coated onto an underlying glass ring substrate to form the disc spacer.

Figure 7A:
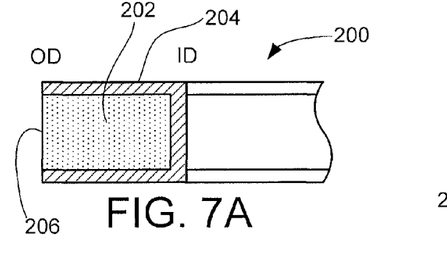
FIGS. 7A-7B illustrate alternative constructions for color coded disc spacers in accordance with further embodiments.

FIG. 7A shows a first exemplary coated glass disc spacer 200. An interior substrate (core) is formed of colored glass as discussed above. Top, bottom and interior surfaces of the core 202 are coated with a metal layer 204, such as nickel (Ni) or an alloy thereof, to provide an electrically conductive path from the top to the bottom of the spacer 200.

It will be appreciated that an outermost surface 206 of the disc core 202 remains uncoated by the layer 204. This permits an inspection window for the optical detector 190 to discern the underlying color of the colored glass. The inspection window can include an entire surface, a portion of one or more surfaces, or a portion or the entirety of multiple surfaces of the core 202.

Figure 7B:
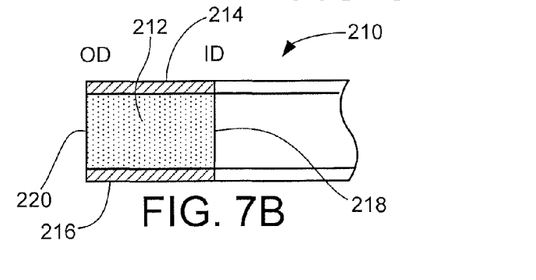

FIG. 7B shows another coated glass disc spacer 210. As before, the spacer 210 includes a colored glass core 212 and respective layers 214, 216 of a suitable metal or other conductive material. In FIG. 7B, an innermost surface 218 and an outermost surface 220 (or portions thereof) of the disc spacer 210 remain uncoated to provide one or more inspection windows to enable the detector 190 (FIG. 6) to detect the color of the core 212. As desired, the detector 190 can be further configured to detect the presence and orientation of one or more of the conductive layers from FIGS. 7A-7B.

Figure 8:
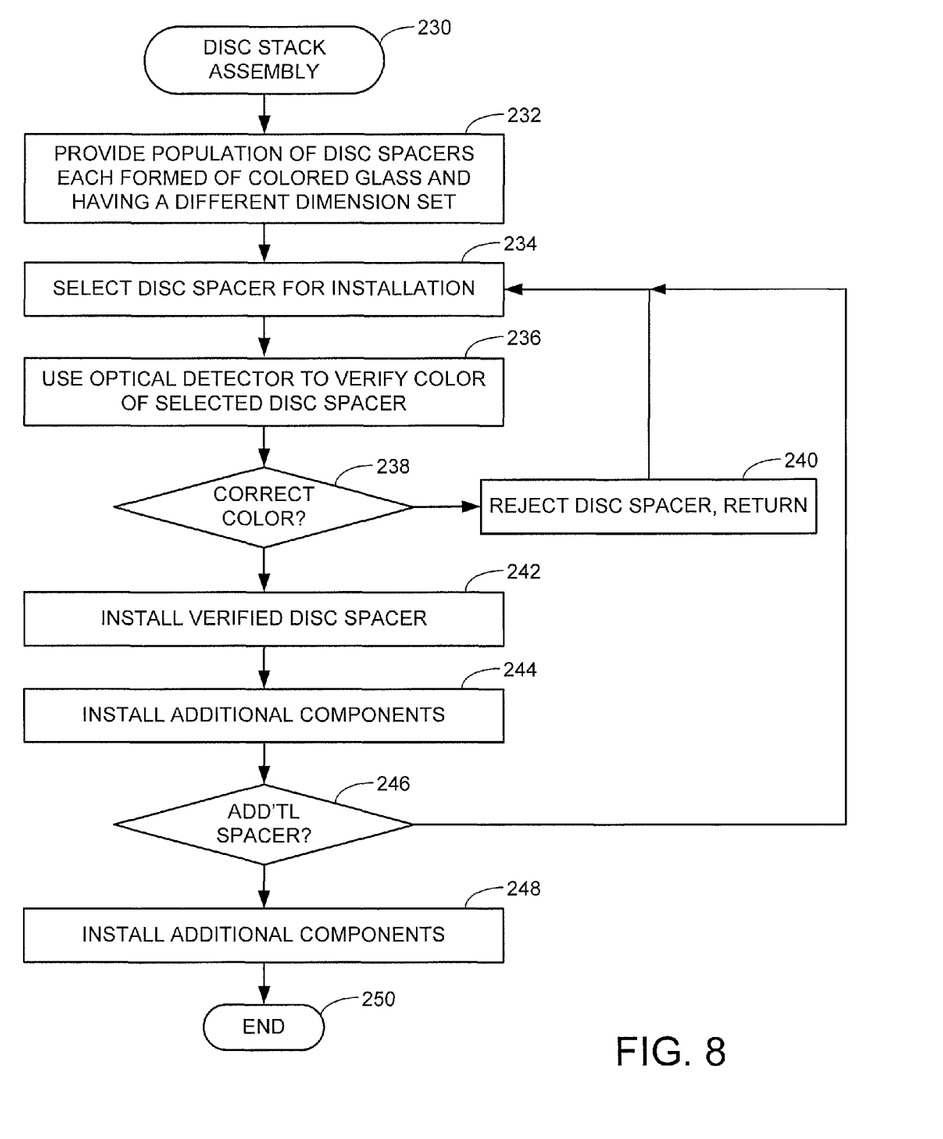
FIG. 8 is a flow chart for a disc stack assembly routine carried out by the automated assembly system of FIG. 6 in accordance with some embodiments.

FIG. 8 provides a disc stack assembly routine 230 to summarize the foregoing discussion. It is contemplated that the routine is carried out by an automated assembly system such as 180 in FIG. 6 to fabricate a population of disc stack assemblies in a high volume manufacturing environment. The routine is not necessarily limited to such applications.

The routine 230 commences at step 232 by providing respective populations of disc spacers formed of colored glass, each population having a different selected color within a particular spectral range to correspond to a different dimension set. A particular disc spacer is selected at step 234 for installation. An optical detector mechanism, such as the detector 190, detects a spectral response from the selected disc spacer at 236 to discern the color thereof. As shown by decision step 238, if the color is incorrect, the disc spacer is rejected and set aside (step 240) and the process returns to step 234 to select a different spacer.

If the correct color is detected, the routine continues to step 242 where the verified disc spacer is installed. Additional components, such as additional discs, clamp mechanisms, etc. are installed at step 244.

Should another spacer be required, as shown by decision step 246, the process returns to step 234 to select the next spacer for the stack. Final component installation occurs at step 248 and the process ends at step 250 with a completed disc stack assembly.

While the foregoing process is directed to the assembly of a disc stack for a data storage device (e.g., HDD), such is not necessarily limiting. In another illustrative example, the processing of FIG. 8 can be used to assemble media into other forms of disc stacks such as multi-disc writers (MDWs) used to write servo data to the discs, test stands, component testers, etc.

Figure 9:
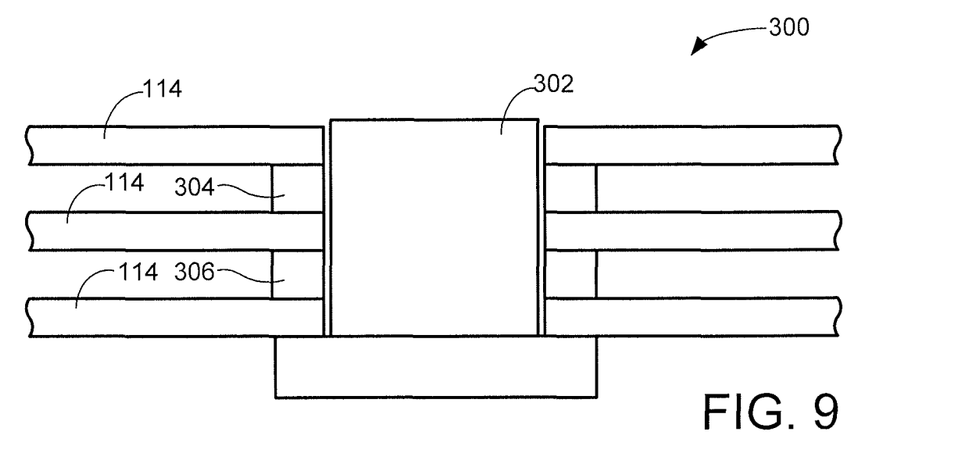
FIG. 9 illustrates another disc stack assembly in accordance with some embodiments.

FIG. 9 shows another disc stack assembly 300 in accordance with some embodiments. A disc clamp has been omitted for clarity of illustration. The disc stack assembly 300 includes a spindle motor hub 302 which supports three (3) rotatable data recording media (discs) 114 and two (2) intervening disc spacers 304 and 306. In FIG. 9, the two disc spacers 304, 306 are nominally the same size and would therefore be normally supplied with the same color scheme since both would be supplied from the same population of disc spacers. The system 180 of FIG. 6 can operate in accordance with the routine 230 of FIG. 8 to form the disc stack assembly 300 in FIG. 9.

Figure 10:
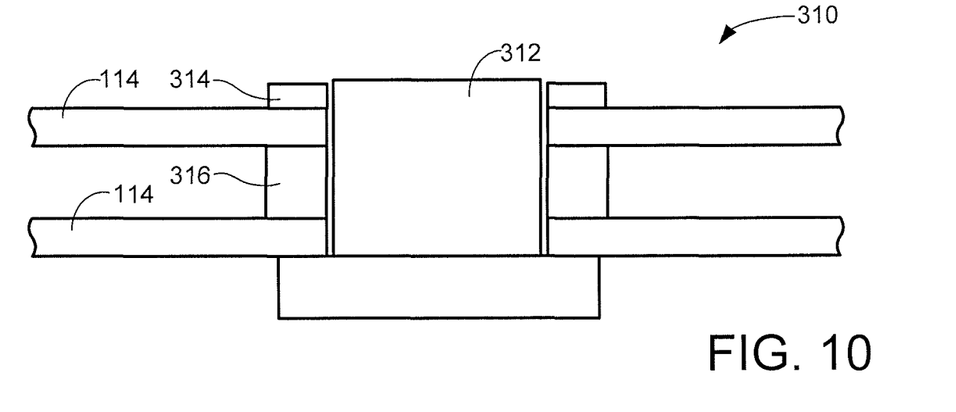
FIG. 10 illustrates another disc stack assembly in accordance with further embodiments.

FIG. 10 shows another disc stack assembly 310 in accordance with further embodiments. The disc stack assembly 310 includes a spindle motor hub 312 having a lower profile (e.g., lower elevational height) as compared to the spindle motor hub 302 in FIG. 9. The hub 312 supports two (2) discs 114 and two (2) disc spacers 314, 316. In this case, the two spacers 314, 316 have different dimensions. It follows that, when assembled by the system 180 (FIG. 6) in accordance with the routine 230 (FIG. 8), the spacers 314, 316 would be provided with different color schemes to ensure proper installation. It is contemplated that each of the different types of spacers 304/306, 314 and 316 in FIGS. 9-10 would be provisioned in different bins 188 (FIG. 6) and selected as required.

Figure 11:
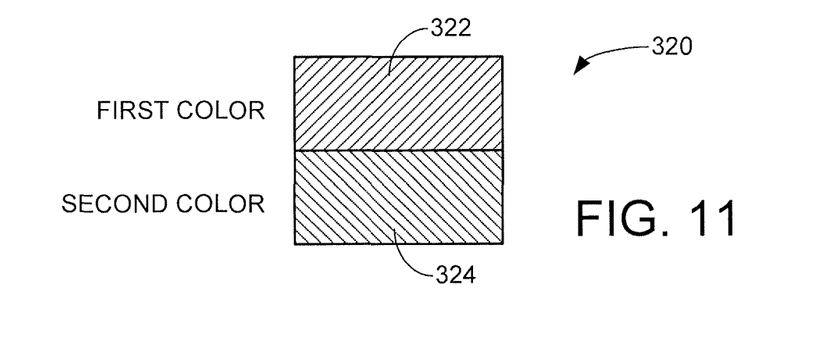
FIG. 11 illustrates another glass disc spacer having multiple color components in accordance with some embodiments.

FIG. 11 illustrates yet another exemplary glass disc spacer 320 in accordance with further embodiments. The spacer 320 is generally similar to the spacers discussed above, but includes multiple portions 322, 324 with different colors. As discussed above, the colored portions may extend to any suitable depth within the body of the spacer as required. Any number of different colors may be used along different surfaces. The use of different colors within the same spacer can provide further options with regard to individual dimensional set identification, as well as orientation guidance for the assembly system. For example, due to shape or construction features, it may be desirable to have the second portion 324 be oriented as shown in FIG. 11 so that it is lower than the first portion 322. The color coded spacers can thus ensure correct dimensional sizes and orientations are achieved during installation.

It will now be understood that the various embodiments disclosed herein can provide benefits over the existing art. The use of color coded disc spacers can provide an easy way to quickly and accurately verify that correctly dimensioned components are being installed. Reliance on color eliminates the need to provide printed indicia upon the disc spacers such as in the form of laser embossments or printed adhesive labels, reducing component processing and potential sources of contamination.

The use of glass provides a relatively lower density material as compared to existing materials such as metal, which can reduce disc imbalance. Glass is durable and, if damaged, will tend to pit rather than fragment as with metal or ceramic, making the spacers suitable for one time applications (as in the case of installation into a disc drive) as well as in multiple time applications (as in the case of MDWs, test stands, etc.).

It is contemplated albeit not necessarily required that the color coded glass spacers will use colors that are in the band of human visible wavelengths, which generally extends from about 350 nanometers, nm to about 700 nm, with red colors near the lower end of this range and violet colors near the upper end of this range. Unsaturated colors discernible by a human observer not in this wavelength, such as pink, may also be used. The use of human observable colors assists in coarse level quality control and material handling aspects of the production process, since the "at least gross" color of a given disc spacer can be immediately detected by a human observer. A "blue" ring in a bin of "red" spacers can thus be observed and corrected without the need to use specialized non-human detector equipment as described above.

Nevertheless, in other embodiments, at least some of the colors may be outside the normal human visible range, including but not limited to infrared (IR) colors below about 350 nm or ultraviolet (UV) colors above about 700 nm. The optical detection equipment can be readily adapted to detect colors in any suitable spectral wavelength range.

Embodiments of the present disclosure have been described with particular reference to the examples illustrated. While specific examples are shown in the drawings and are herein described in detail, it should be understood, however, that the drawings and detailed description are not intended to limit the disclosure to the particular form disclosed. It will be appreciated that variations and modifications may be made to the examples described within the scope of the present disclosure.

What is claimed is:

1. An apparatus comprising:
    a plurality of populations of disc spacers configured to support a recording disc adjacent a spindle hub, each population of disc spacers having a different common color corresponding to a unique dimension of each of the disc spacers in the associated population, each of the disc spacers in the plurality of populations of disc spacers formed of a glass material and at least one additive to produce the associated common color of each population;
    a data structure stored in a memory location that correlates the common color of each population to the unique dimension of the associated population;
    an end effector configured to grasp a disc spacer from each of the plurality of populations;
    an optical detector configured to detect the color of each disc spacer grasped by the end effector; and
    a control circuit configured to direct the end effector to install each of the grasped disc spacers by the end effector onto a spindle motor hub responsive to the detected color thereof by the optical detector and responsive to the data structure stored in the memory location.

2. The apparatus of claim 1, wherein the at least one additive comprises copper (Cu), neodymium (Nd), tin (Sn), manganese (Mn), sulfur (S), iron (Fe), carbon (C), nickel (N), gold (Au) or selenium (Se).

3. The apparatus of claim 1, wherein the unique dimension comprises at least one of an outermost diameter (OD) of the disc spacers, an innermost diameter (ID) of the disc spacers, a width of the disc spacers or a thickness of the disc spacers.

4. The apparatus of claim 1, wherein the common color of the disc spacers in each population is a different one of red, orange, yellow, green, blue, violet, brown, or black to identify the unique dimension of each of the disc spacers in the associated population.

5. The apparatus of claim 1, wherein the glass material comprises silicon dioxide and the at least one additive is mixed with the silicon dioxide to provide a nominally uniform color distribution through an overall thickness of the disc spacer.

6. The apparatus of claim 1, wherein each of the common colors has a wavelength in a human detectable range of from about 350 nanometers (nm) to about 700 nm.

7. The apparatus of claim 1, wherein the glass material and at least one additive form a glass core of each disc spacer, and wherein each disc spacer further comprises a layer of conductive material affixed to less than a totality of an external surface area of the disc spacer to form an inspection window portion that exposes the color of the disc spacer therethrough.

8. The apparatus of claim 1, wherein the end effector is arranged to place a selected disc spacer between axially aligned first and second magnetic recording discs to establish a selected inter-disc axial spacing therebetween with respect to the spindle motor hub.

9. The apparatus of claim 1, wherein a selected one of the plurality of populations of disc spacers has two common colors comprising a first color extending across a first portion of each disc spacer in the selected one of the plurality of populations and a different, second color extending across a second portion of each disc spacer in the selected one of the plurality of populations, and wherein the end effector is further configured to orient a selected disc spacer from the selected one of the plurality of populations such that the second color is positioned to contactingly engage an upwardly directed facing surface supported by the spindle motor hub.

10. The apparatus of claim 1, wherein at least one of the common colors has a wavelength outside a human detectable range of from below about 350 nanometers (nm) or above about 700 nm.

11. A method comprising:
    arranging into separate bins a plurality of populations of disc spacers configured to support a recording disc adjacent a spindle hub, each population of disc spacers having a different common color corresponding to a unique dimension of each of the disc spacers in the associated population, each of the disc spacers in the plurality of populations of disc spacers formed of a glass material and at least one additive to produce the associated common color of each population;
    storing, in a memory location, a data structure that correlates the common color of each population to the unique dimension of the associated population;
    configuring an end effector to grasp a disc spacer from each of the plurality of populations in turn;
    using an optical detector to detect the color of each disc spacer grasped by the end effector; and
    using a control circuit to direct the end effector to install each of the grasped disc spacers by the end effector onto a spindle motor hub responsive to the detected color thereof by the optical detector and responsive to the data structure stored in the memory location.

12. The method of claim 11, wherein the at least one additive comprises copper (Cu), neodymium (Nd), tin (Sn), manganese (Mn), sulfur (S), iron (Fe), carbon (C), nickel (N), gold (Au) or selenium (Se).

13. The method of claim 11, wherein the unique dimension comprises at least one of an outermost diameter (OD) of the disc spacers, an innermost diameter (ID) of the disc spacers, a width of the disc spacers or a thickness of the disc spacers.

14. The method of claim 11, wherein the common color of the disc spacers in each population is a different one of red, orange, yellow, green, blue, violet, brown, or black to identify the unique dimension of each of the disc spacers in the associated population.

15. The method of claim 11, wherein the glass material comprises silicon dioxide and the at least one additive is mixed with the silicon dioxide to provide a nominally uniform color distribution through an overall thickness of the disc spacer.

16. The method of claim 11, wherein each of the common colors has a wavelength in a human detectable range of from about 350 nanometers (nm) to about 700 nm.

17. The method of claim 11, wherein the glass material and at least one additive form a glass core of each disc spacer, and wherein each disc spacer further comprises a layer of conductive material affixed to less than a totality of an external surface area of the disc spacer to form an inspection window portion that exposes the color of the disc spacer therethrough.

18. The method of claim 11, wherein the end effector is arranged to place a selected disc spacer between axially aligned first and second magnetic recording discs to establish a selected inter-disc axial spacing therebetween with respect to the spindle motor hub.

19. The method of claim 11, wherein a selected one of the plurality of populations of disc spacers has two common colors comprising a first color extending across a first portion of each disc spacer in the selected one of the plurality of populations and a different, second color extending across a second portion of each disc spacer in the selected one of the plurality of populations, and wherein the end effector is further configured to orient a selected disc spacer from the selected one of the plurality of populations such that the second color is positioned to contactingly engage an upwardly directed facing surface supported by the spindle motor hub.

20. The method of claim 11, further comprising using the end effector to install a first spacer onto a selected spindle motor hub having a first common color, and subsequently using the end effector a second spacer onto the selected spindle motor hub having a different, second common color.

* * * * *